United States Patent [19]
Sahara et al.

[11] 3,896,460
[45] July 22, 1975

[54] ELECTRIC SHUTTER FOR PROGRAMMED EXPOSURE CONTROL

[75] Inventors: Masayoshi Sahara; Sinji Tominaga, both of Sakai, Japan

[73] Assignee: Minolta Camera Kabushiki Kaisha, Osaka, Japan

[22] Filed: Aug. 31, 1973

[21] Appl. No.: 393,584

[30] Foreign Application Priority Data
Aug. 31, 1972 Japan.............................. 47-101939

[52] U.S. Cl. ....................... 354/38; 354/51; 354/60
[51] Int. Cl. .............................................. G03b 7/08
[58] Field of Search ........... 95/10 C, 10 CE, 10 CT, 95/10 CP, 64 C; 354/23, 24, 26, 29, 30, 36, 37, 38, 40, 43, 48, 50, 51, 60

[56] References Cited
UNITED STATES PATENTS
3,455,219  7/1969  Burganella ............................ 354/43
3,460,450  8/1969  Ogihara ................................ 354/51

*Primary Examiner*—Joseph F. Peters, Jr.
*Attorney, Agent, or Firm*—Staas & Halsey

[57] ABSTRACT

This invention relates to an electric shutter for programmed exposure control comprising a first light responsive circuit composed of a resistor and a photoconductive cell, a first switching circuit controlled by a voltage level present at the connection point of the resistor and the photoconductive cell making up the first light responsive circuit, a first electromagnet controlled by the first switching circuit to set selectively the lens aperture of a camera to one of two values, a second light responsive circuit including a plurality of resistors and a photoconductive cell selectively interconnected by a switch ganged with the first electromagnet, a second switching circuit controlled by the output from the second light responsive circuit, the trigger voltage level of the second switching circuit being changed over by the switch ganged with the first electromagnet, and a second electromagnet controlled by the second switching circuit to determine at least the camera shutter speed.

4 Claims, 3 Drawing Figures

ELECTRIC SHUTTER FOR PROGRAMMED EXPOSURE CONTROL

CROSS-REFERENCE TO CO-PENDING APPLICATION

Reference is made to the commonly-assigned co-pending application Ser. No. 396,7655, filed Sept. 12, 1973, now U.S. Pat. No. 3,871,006, based on Japanese Utility Model Application No. 108890/1972.

BACKGROUND OF THE INVENTION

1. Field of the Invention

This invention relates to an electric shutter for programmed exposure control, and more particularly to an electric shutter for programmed exposure control which is simplified in construction and provides a camera at low cost without lowering performance.

2. Description of the Prior Art

An electric shutter for programmed exposure control heretofore known is an electric shutter for a camera of the so-called diaphragm shutter type which is of such a construction that where the scene brightness is lower than a predetermined level, at an initial step of a shutter releasing operation, a luminous element such as a lamp or the like is lighted in a finder to indicate that the scene brightness is insufficient for taking a non-blurred picture with only supporting the camera by hands. Then the lock of a shutter blade opening member, which member also is used as a diaphragm member, is released by the shutter releasing operation. The shutter blade is gradually opened with the lapse of time. At the same time, a capacitor of a time constant circuit composed of the capacitor and a photoconductive cell, whose resistance value varies with the scene brightness, is caused to start charging or discharging. When a voltage developed across the capacitor has reached a predetermined value, a shutter blade closing member is driven. In front of a light receiving face of the photoconductive cell, there is disposed a filter capable of setting the quantity of light to be transmitted therethrough in accordance with the sensitivity of a film used, by which the shutter can be adapted for films of various sensitivities.

In the electric shutter of such a construction, a retarding mechanism such as a governor is required for gradually opening the shutter blade with the lapse of time and this is a main cause of the high cost of such cameras.

Further, there has also been known an electric shutter of such a construction that a diaphragm mechanism is provided in front of the light receiving face of a light receiving element such as a photoconductive cell or the like, separately of the diaphragm for the lens. In this shutter mechanism, the light receiving element is used as one side of a bridge circuit, whose output is fed to a diaphragm driving member for driving the diaphragm such as a meter or the like to balance the bridge circuit, thus automatically setting the lens aperture.

In such an electric shutter, too, the automatic lens aperture setting mechanism including the bridge circuit is complicated in construction and increases the cost of the camera.

SUMMARY OF THE INVENTION

An object of this invention is to provide an electric shutter for programmed exposure control which is free from the aforesaid defects encountered in the prior art, is simple in construction to simplify its operation, and has a relatively wide exposure range so as to maintain the same performance as that of the conventional shutters.

The electric shutter for programmed exposure control according to this invention comprises a first light responsive circuit which is composed of a resistor and a photoconductive cell; a first switching circuit which is controlled by a voltage level at the connection point of the resistor and the photoconductive cell making up the first light responsive circuit; a first electromagnet controlled by the first switching circuit to set selectively the diaphragm aperture of a camera shutter to one of two values; a second light responsive circuit including a plurality of resistors and a photoconductive selectively interconnected by a switch ganged with the first electromagnet; a second switching circuit which is controlled by the output from the second light responsive circuit and whose trigger voltage level is changed over by the switch ganged with the first electromagnet; and a second electromagnet which is controlled by the second switching circuit to determine at least the shutter speed.

In a further feature of the electric shutter of this invention, the lens aperture is automatically set at either one of, for example, F2.8 and F8 in accordance with the scene brightness. A second feature resides in that the switching level of the switching circuit for controlling the exposure time is automatically set corresponding to the lens aperture and the exposure time is set simultaneously with the automatic setting in accordance with the scene brightness. Thus, without the necessity of a complicated governor mechanism for controlling the movement of the shutter blade opening member, a balancing mechanism provided with a bridge circuit for driving the diaphragm in ganged relation. It is detected by the first light responsive circuit and the first switching circuit whether the level of the scene brightness is above or below a predetermined value and, according to the result of this detection, the first electromagnet is turned on or off, by which the diaphragm aperture is selectively set at, for example, F8 or F2.8. The electric shutter of this invention employs an extremely simple circuit construction which performs simple on-off operations having no intermediate points, but retains a relatively wide exposure range, and hence enables the production of cameras which are inexpensive and full of utility.

BRIEF DESCRIPTION OF THE DRAWINGS

In the detailed description of the preferred embodiments of the invention presented below, reference is made to the accompanying drawings in which.

DESCRIPTION OF THE PREFERRED EMBODIMENTS

Figure 1:
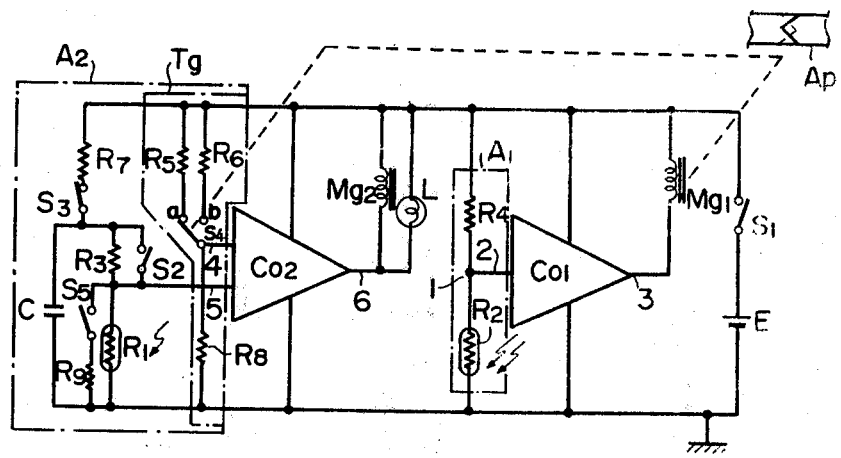
FIG. 1 is a circuit diagram showing one example of this invention.

FIG. 1 is a circuit diagram of one example of this invention. In this example, a photoconductive cell $R_2$ and a resistor $R_4$ form a first light responsive circuit $A_1$, wherein the potential at the connection point 1 of the photoconductive cell $R_2$ and the resistor $R_4$ varies with the scene brightness. An input terminal 2 of a first switching circuit $C_{01}$ is connected to the connection point 1 and an output terminal 3 of the switching circuit $C_{01}$ is connected to a first electromagnet or drive means $Mg_1$. The output from the switching circuit $C_{01}$ is in the on or off state and this is dependent on whether the input level is above or below a predetermined value. The magnet $Mg_1$ has an excited and a non-excited mode of operation in accordance with the state of the output from the switching circuit $C_{01}$, by which a lens aperture $Ap$ is actuated to select either one of values such, for example, as F8 and F2.8 and, at the same time, the trigger level of a second switching circuit $C_{02}$ described later is altered in ganged relation to the operation of the lens aperture $Ap$.

The second switching circuit $C_{02}$ is provided for indicating that the scene brightness is insufficient for taking a non-blurred picture while supporting the camera only by hand and for controlling the exposure time. Its one input terminal 4 is supplied with a trigger voltage of a predetermined level and the other input terminal 5 is supplied with a signal from a second light responsive circuit $A_2$ described later. An output terminal 6 of the second switching circuit $C_{02}$ is connected to a second electromagnet or drive means $Mg_2$ for controlling a retaining member of a shutter blade and to an insufficient scene brightness indicating member L such, for example, as a lamp. Where the voltage level at the input terminal 5 is higher than that at the input terminal 4, the electromagnet $Mg_2$ is excited to hold the retaining member of the shutter blade and the indicating member L is energized to provide the indication. Conversely, where the voltage level at the input terminal 5 is lower than that at the input terminal 4, excitation of the electromagnet $Mg_2$ is cut off to release the holding of the retaining member, closing the shutter.

A trigger section $Tg$ included in the second light responsive circuit $A_2$ is provided for applying a trigger voltage to the input terminal 4 of the switching circuit $C_{02}$ and is composed of resistors $R_5$, $R_6$ and $R_8$ and a switch $S_4$. The switch $S_4$, which is switched by the electromagnet $Mg_1$, can impress trigger voltages of two levels to the input terminal 4. The second light responsive circuit $A_2$ comprises the trigger section $Tg$, a photoconductive element $R_1$, resistors $R_3$, $R_7$ and $R_9$, a capacitor C and switches $S_2$, $S_3$ and $S_5$. The photoconductive cell $R_1$ is connected in series to the resistor $R_3$, and the capacitor C is connected in parallel with this series connection circuit. The resistor $R_3$ is connected in parallel to the switch $S_2$, which short-circuits it when closed. The photoconductive element $R_1$ is connected in parallel with a serially connected switch $S_5$ and resistor $R_q$. Between the connection point of the capacitor C and the resistor $R_3$ and the resistor $R_7$, there is inserted a counting switch $S_3$. The resistance value of the resistor $R_7$ is selected to be small as compared with those of the resistor $R_3$ and $R_9$ and that of the photoconductive element $R_1$ in its normal state. When the switch $S_3$ is closed, the capacitor C is charged to such an extent that the stored voltage may be substantially equal to the voltage of the power source E. The resistor $R_7$ is provided for preventing a dash current at the time of connecting a power source switch $S_1$. The resistor $R_9$ becomes connected in parallel with the photoconductive cell $R_1$ by the switch $S_5$, which is closed when the camera is used with a strobe unit and serves to provide an exposure time within a specific value. The switch $S_2$ is opened in the case of detecting the scene brightness of insufficient intensity to provide a warning not to take a picture by supporting a camera only by hand. In the case of photographing, the switch $S_2$ is closed before opening of the shutter. The switch $S_3$ is opened simultaneously with the opening of the shutter. The lens aperture Ap acts to have one of two aperture values, for example, F8 and F2.8, in accordance with the on and off states of the electromagnet $Mg_1$. The aperture selecting mechanism including electromagnet $Mg_1$ is more fully described in the above-identified co-pending U.S. Application based upon Japanese Utility Model Application No. 108890/1972.

Figure 2:
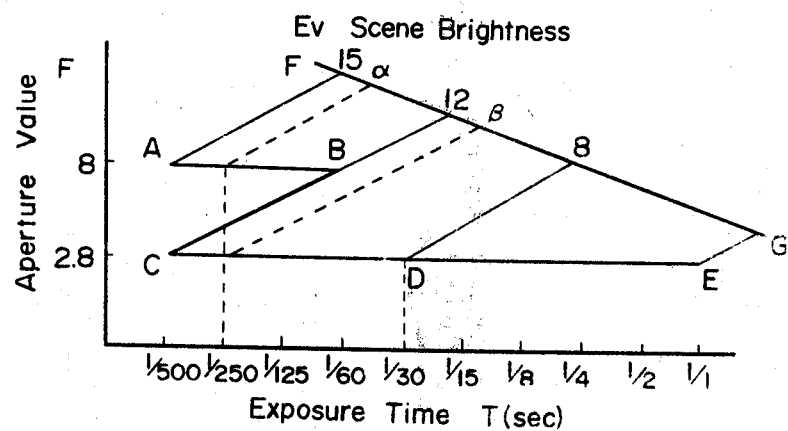
FIG. 2 is a program chart, for explaining the operation of the shutter of this invention.

Referring now to FIG. 2, a description will be given of the operation of the example of this invention constructed as described above. FIG. 2 is a program chart of the shutter associated with the operation of the circuit depicted in FIG. 1. In FIG. 2, the abscissa represents the exposure time controlled by the circuit and the ordinate the aperture value. As mentioned previously, the aperture value is either one of, for example, F8 and F2.8. The segment FG indicates the scene brightness in terms of Ev (an exposure value in the sense used in the APEX system (ASAPH 212-1961)). It is apparent that as the brightness decreases past $Ev12$, the aperture value changes from F8 to F2.8. Where the exposure time is shorter than 1/60 sec. the aperture value may be either of F8 and F2.8, but if the exposure time is longer than 1/60 sec., only F2.8 is used. The indication of insufficient scene brightness is provided in the region in which the exposure time is longer than, for example, 1/30 sec.

Next, the operation of the circuit will be described commencing with the shutter release operation. Assume that the film has been wound up and that shutter charge has been completed. To more fully appreciate the description of the operation found below, reference is made to U.S. Pat. No. 3,535,989, which discloses an illustrative mechanism for sequentially actuating the various switches shown in FIG. 1 in connection with the shutter releasing operation. At this stage before shutter release, the switch $S_1$ is open, the switch $S_2$ also is open, the switch $S_3$ is closed, the switch $S_4$ is disposed at its contact $a$ and the switch $S_5$ is open in case of ordinary photographing. At the initial step of depressing a shutter button, the switch $S_1$ is closed to charge the capacitor C through the resistor $R_7$ and the switch $S_3$. At this step, light measuring is achieved for determining whether or not the scene brightness is in the region requiring the indication of insufficient scene brightness and this corresponds to the detection whether or not the scene brightness is above or below the point of $Ev8$ shown in FIG. 2. Accordingly, it is necessary that, of two levels of the trigger voltage of the switching circuit $C_{02}$, the level corresponding to the aperture value F2.8 has been selected. The reason why the two levels are set for the trigger voltage of the switching circuit $C_{02}$ will be described later on. At this stage, regardless of the operation of the switching circuit $C_{01}$, the trigger voltage level corresponding to F2.8 is selected by a mechanism coupled in ganged relation to a shutter releasing member (not shown) to dispose the switch $S_4$ to its contact $a$. Thus, the voltage level determined by the resistors $R_5$ and $R_8$ is applied to the input terminal 4. Further, the information on the scene brightness is converted into a voltage level; in particular, the power source voltage is divided by the reference resistor $R_3$ and the photoconductive cell $R_1$ for the detection of the intensity range requiring the indication of insufficient scene brightness, and then is fed to the input terminal 5. As the scene becomes darker, the resistance value of the photoconductive cell $R_1$ increases, so that the potential at the input terminal 5 is high but when it exceeds the trigger voltage level at the input terminal 4, the potential at the output terminal 6 of the switching circuit $C_{02}$ decreases and a current flows in the electromagnet $Mg_2$ and to the indicating member L to indicate that the scene brightness is in the region of insufficient scene brightness below $Ev8$. Where the scene brightness is $Ev8$, the switching circuit $C_{02}$ provides an output for interrupting the current flowing in the electromagnet $Mg_2$ and the indicating member L. It is needless to say that, in this case, even if the electromagnet $Mg_2$ is not excited, the lock of the shutter blade is not released so long as the shutter is not opened.

At the same time the aforesaid operations are carried out, the scene brightness is detected by the switching circuit $C_{01}$ for selecting the aperture value. This detection of the scene brightness is achieved on the basis of $Ev12$. Where the brightness is below $Ev12$, the electromagnet $Mg_1$ is not excited and the switch $S_4$ is not changed over and remains closed on the side of the contact $a$. While, where the brightness exceeds $Ev12$, the electromangnet $Mg_1$ is excited and the aperture value is altered to F8 and, at the same time, the switch $S_4$ is changed over to be disposed in contact with terminal $b$. However, since the trigger voltage level of the switching circuit $C_{02}$ is required to correspond to F2.8 at this stage as described previously, a locking mechanism is provided which is ganged with the shutter blade actuating member so that the switch $S_4$ is not changed over to the contact $b$. If the locking mechanism is released by the stroke of the shutter blade at a step following the depression of the shutter button and if the electromagnet $Mg_1$ is excited, the switch $S_4$ is changed over.

Depressing further the shutter button, the switch $S_2$ is closed. Then, the voltage level at the input terminal 5 becomes substantially equal to the charged voltage of the capacitor C, that is, the power source voltage, and this voltage level is higher than that at the input terminal 4 and the switching circuit $C_{02}$ derives therefrom an output to provide a supply of a current to the electromagnet $Mg_2$ and the indicating member L.

At a final stage of the depression of the shutter button, the shutter is opened and, at the same time, the switch $S_3$ is opened. Then, the supply of the charge to the capacitor C through the switch $S_3$ is cut off and the charge stored in the capacitor C is discharged through the switch $S_2$ and the photoconductive cell $R_1$. The voltage charged on the capacitor C discharges in accordance with a curve of a time constant which depends on the photoconductive cell $R_1$ and the capacitor C. Since the time constant in this case varies with the scene brightness, it is possible to obtain an exposure time corresponding to the scene brightness as is well known.

In this manner, when the voltage level at the input terminal 5 gradually decreases lower than the trigger voltage level fed to the input terminal 4, the current flowing in the electromagnet $Mg_2$ and the indicating member L is interrupted by the action of the switching circuit $C_{02}$ and the lock of the shutter blade closing member is released to close the shutter, thus completing exposure.

As will be apparent from the foregoing description, the indicating member L is lighted when the scene brightness is in the region of insufficient brightness, but it is lighted also in the case where the shutter is open. Further, the indicating member L is lighted in the interval between the completion of the detection of the scene brightness for the indication of insufficient brightness immediately before opening of the shutter and the initiation of exposure by further depression of the shutter button, too. Namely, the indicating member L is lighted for a period of time until the switch $S_3$ is released after the switch $S_2$ is closed. However, this period is extremely short and it is possible to consider that lighting of the indicating member L takes place only during exposure, so that the above-mentioned lighting can be regarded as performing the function of confirming the achievement of exposure.

In the case of photographing with a strobe unit, the switch $S_5$ is closed. A time constant circuit formed in this case is composed of a parallel connection of the resistor $R_9$ and the photoconductive cell $R_1$ as a resistance component, so that even where the scene is dark and the resistance value of the photoconductive cell $R_1$ is very large, the exposure time is selected within a value limited by the resistor $R_9$.

Now, a description will be made with regard to the reason why the two trigger voltage levels of the switching circuit $C_{02}$ are set. Namely, in the time constant circuit composed of the capacitor C and photoconductive cell $R_1$, the discharge curve of the capacitor C differs dependent on whether the light incident to the photoconductive cell $R_1$ is bright or dark. In FIG. 2, for example, in the cases of the scene brightness being $Ev\alpha(>Ev12)$ and $Ev\beta(<Ev12)$, the aperture values are F8 and F2.8 respectively but the exposure time is 1/250 sec. in both cases. It will be seen that setting of two trigger voltage levels of the switching circuit $C_{02}$ is necessary for obtaining the same exposure time in spite of different scene brightnesses and different discharge curves in the time constant circuit.

In the circuit depicted in FIG. 1, it is possible to select the circuit constant so that the sensitivity of a film used may be adapted for a specific film (for example, ASA 100); but, in order to enable the use of films of different sensitivities, it is sufficient only to provide filters for adjusting the quantity of light in front of the light receiving faces of the photoconductive cells $R_1$ and $R_2$ and select them in accordance with the sensitivity of the film used.

Figure 3:
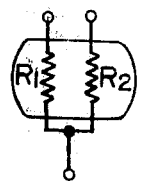
FIG. 3 is a diagram, for explaining a compound photoconductive cell suitable for use in the example of FIG. 1.

FIG. 3 is a diagram showing a compound photoconductive cell which is an assembly of the photoconductive cells $R_1$ and $R_2$ employed in the example of FIG. 1. This cell has three terminals, and hence makes the construction of a camera compact when incorporated therein.

Though the electromagnet is excited when the scene brightness exceeds a predetermined level, it is possible to operate the electromagnet in an opposite mode by exchanging respective positions of the resistor R4 and the photoconductive cell R2. In such a case, the mechanism for switch S4 might be so constructed as to hold the switch at that contact corresponding to the smaller aperture upon energization of the electromagnet and allow the switch S4 to be changed over to the other contact corresponding to the larger aperture in relation with the shutter releasing operation upon de-energization of the electromagnet.

It will be apparent that many modifications and variations may be effected without departing from the scope of the novel concepts of this invention.

What is claimed is:

1. Exposure control apparatus for programmed exposure control of a camera according to the intensity of scene illumination, said exposure control apparatus comprising:
    a. light responsive means responsive to the intensity of the scene illumination for providing first and second output signals corresponding thereto, said light responsive means including means for providing an output level which changes in one direction from an initial level at a ratio determined by said second output signal, from initiation of the exposure;
    b. first drive means actuable for facilitating the setting of the lens aperture of the camera between a first relatively large aperture and a second relatively small aperture;
    c. first switching means responsive to the first output signal representative of a scene illumination above a predetermined level for actuating said first drive means to set the lens aperture from said first relatively large aperture to said second relatively small aperture and responsive to the first output signal representative of a scene illumination below said predetermined level for actuating said first drive means to set the lens aperture from said second relatively small aperture to said first relatively large aperture;
    d. second drive means for terminating the exposure interval of the camera shutter;
    e. second switching means for actuating said second drive means, said second switching means actuating said second drive means when said output level from the providing means traverses a variable threshold value, said first drive means setting the variable threshold value of said second switching means to a level relatively near said initial level when the lens aperture of the camera is set at its relatively large aperture opening and setting the variable threshold value to a level relatively far from said initial level when the lens aperture of the camera is set at its relatively small aperture opening.

2. Exposure control apparatus as claimed in claim 1, wherein said light responsive means includes a first light responsive circuit comprising a first radiation responsive element and an impedance element for producing the first output signal, said first output signal being provided at the point of interconnection of said elements, and a second light measuring circuit comprising a capacitive element and a second radiation responsive element connected in parallel with said capacitive element, and a switch operable when closed for connecting said elements in parallel to a terminal for receiving a source potential for charging said capacitive element and for producing said second output signal across said radiation responsive element, and when said switch is opened, said capacitive element discharging through said radiation responsive element for providing said output level which changes at a ratio determined by the second output signal, said second switching means further responding to said output level being below the variable threshold value during discharging of said capacitive element to actuate said second drive means.

3. Exposure control apparatus as claimed in claim 1, wherein said second switching means includes a biasing circuit comprised of first and second resistive elements and a switch coupled to said first drive means, said switch operative in a first position to connect said first resistive element in said biasing circuit to establish said threshold value at the said level relatively near said initial level and in a second position to connect said second resistive element in said biasing circuit to establish said threshold value at the said level relatively far from said initial level.

4. Exposure control apparatus as claimed in claim 1, wherein said second switching means is connected to a visual warning device for providing an indication when scene illumination is below a predetermined value.

* * * * *

UNITED STATES PATENT OFFICE
CERTIFICATE OF CORRECTION

Patent No. 3,896,460      Dated July 22, 1975

Inventor(s) Masayoshi Sahara and Sinji Tominaga

It is certified that error appears in the above-identified patent and that said Letters Patent are hereby corrected as shown below:

Column 1, line 6, "396,7655" should be --396,655.
Column 3, line 53, "Rq" should be --$R_9$--.

Signed and Sealed this twenty-eight Day of October 1975

[SEAL]

Attest:

RUTH C. MASON
Attesting Officer

C. MARSHALL DANN
Commissioner of Patents and Trademarks